K. C. RANDALL.
ELECTRICAL APPARATUS.
APPLICATION FILED APR. 5, 1907.
905,922.
Patented Dec. 8, 1908.
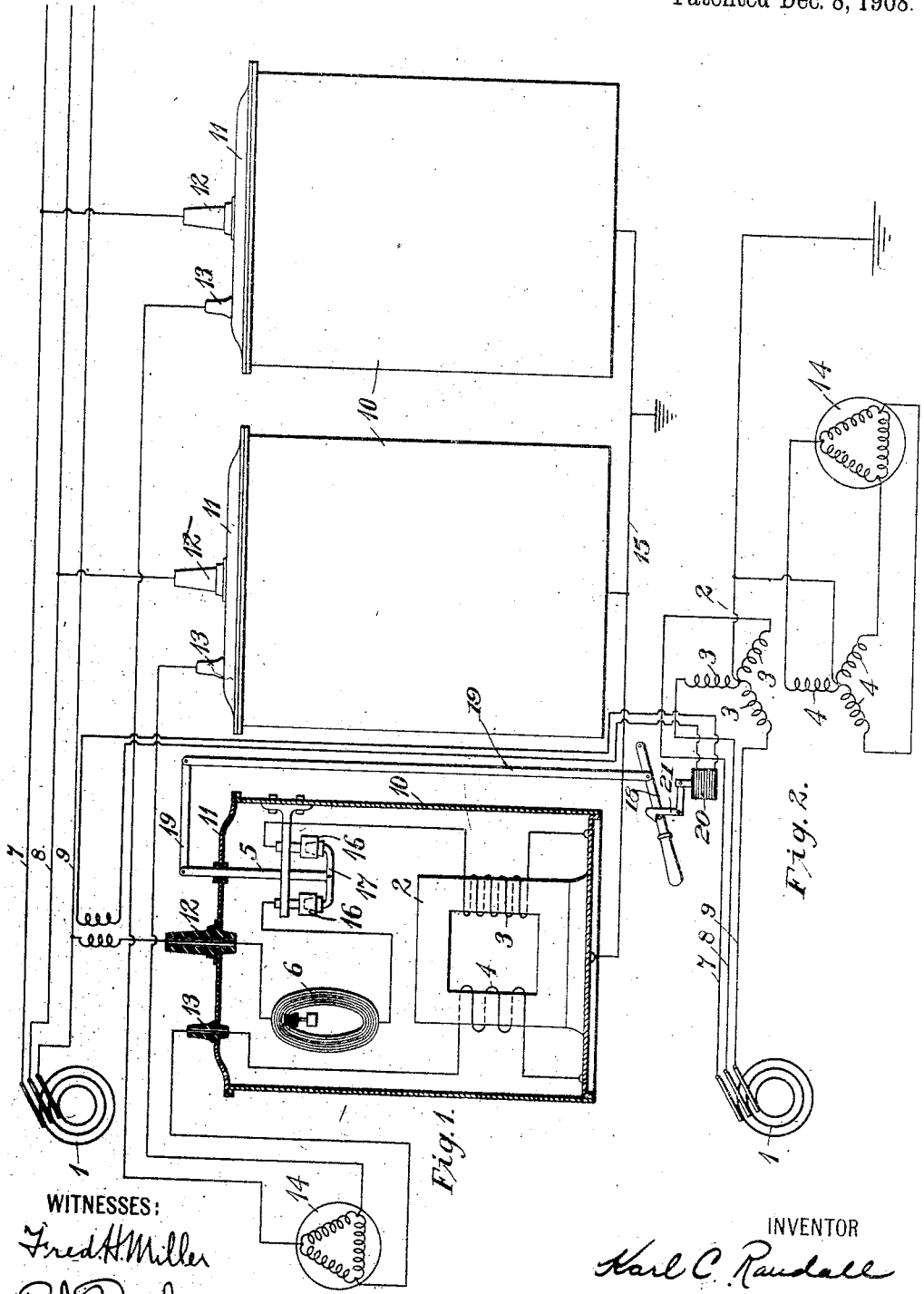

UNITED STATES PATENT OFFICE.

KARL C. RANDALL, OF EDGEWOOD PARK, PENNSYLVANIA, ASSIGNOR TO WESTINGHOUSE ELECTRIC & MANUFACTURING COMPANY, A CORPORATION OF PENNSYLVANIA.

ELECTRICAL APPARATUS.

No. 905,922.   Specification of Letters Patent.   Patented Dec. 8, 1908.

Application filed April 5, 1907. Serial No. 366,505.

To all whom it may concern:

Be it known that I, KARL C. RANDALL, a citizen of the United States, and a resident of Edgewood Park, in the county of Allegheny and State of Pennsylvania, have invented a new and useful Improvement in Electrical Apparatus, of which the following is a specification.

My invention relates to the protection and disposition of electrical apparatus and it has for its object to provide an improved means for the protection of electrical apparatus from the weather and mechanical injury that shall be specially simple, portable and economical of space and that shall involve the use of a minimum number of insulating bushings.

Electric transformers are often disposed in tanks or cases which serve as a protective means and which contain oil or other insulating fluid adapted both for cooling and for insulating the coils. In service, it is usually necessary to provide bushings of porcelain or similar material through which conductors extend for transmitting the energy to and from the transformer. Similar insulators, housings and protected leads are employed in connection with circuit interrupters and protective devices on relatively high voltage circuits and they are usually provided at considerable expense.

According to my present invention, I locate a transformer, a circuit interrupter, and a choke coil or other protective device in a single tank or casing which contains insulating fluid, such as oil or air, and, in this way, I materially reduce the number of insulating bushings and housings required for the system.

Figure 1, of the accompanying drawings, is a diagrammatic view of a system of electrical distribution, the elements of which are divided into groups which are disposed in single tanks in accordance with my invention, and Fig. 2 is a diagram of the circuit connections of the system of Fig. 1.

Referring to the drawings, the system illustrated comprises an alternating current generator 1, transformers 2 having primary windings 3 and secondary windings 4, circuit interrupters 5 and choke coils 6. The primary windings 3 are supplied with energy from the generator 1 through line conductors 7, 8 and 9, choke coils 6 and circuit interrupters 5, a well known star connection being effected by interconnecting the opposite ends of the primary windings as hereinafter explained.

The transformers, circuit interrupters and choke coils are divided into groups and are disposed in fluid-containing tanks or cases 10 one of which is shown in section to disclose the apparatus therein. The cases 10 may be made of boiler iron or other conducting material and, as illustrated, are provided with closely fitting covers 11 in which insulating bushings 12 and 13 are supported, the secondary coils 4 being connected to some translating device, as a motor 14, by leads which extend through the bushings 13 and the generator conductors being insulated from the covers by the bushings 12. The neutral points of the windings are established by connecting the free ends of the primary and secondary coils to the tanks 10 which in turn are interconnected by conductors 15.

It will be observed that a single high-voltage insulating bushing is required for each transformer and that this bushing also serves for insulating the leads of the choke coil and circuit interrupter which ordinarily would be provided with two or more insulating bushings of this character. The circuit interrupters may be of any well known type, either manually or automatically operated and, as illustrated, each comprises stationary contact members 16, a movable contact member 17, an operating handle 18, connecting links 19, a tripping coil 20 and a latch 21.

Referring particularly to Fig. 2, a three-phase generator 1 supplies energy to the star-connected primary winding of a transformer 2, the star-connected secondary winding of which is connected to a motor 14. The three legs of the transformer may be disposed in separate tanks as shown in Fig. 1 or the entire device, with the necessary switching and protective apparatus, may be inclosed in a single tank.

It will be readily understood that my invention is not restricted in its use to the arrangement shown and that a material saving in space and expense will be effected by disposing in a single tank a transformer and either one or both of the protective and switching devices shown in the drawings, since a single set of bushings is required instead of several sets.

I claim as my invention:

1. The combination with a fluid-containing tank, of a transformer and a circuit interrupter located in the tank.

2. The combination with a transformer and a fluid-containing casing therefor, of a circuit interrupter for the transformer also located in said casing.

3. The combination with a transformer, an automatic circuit interrupter and a protective device, of a single fluid-containing casing for said devices.

4. In an electrical apparatus, the combination with a plurality of electrically connected devices, of a single fluid-containing casing therefor.

5. The combination with a transformer, a circuit interrupter, and a protective device, of a fluid-containing tank or casing, insulating bushings supported in the walls of the tank, line conductors which pass through the bushings and interconnect the device within the tank, and means for sealing the tank.

6. The combination with a transformer, a circuit interrupter, and a choke coil, of a single oil-containing casing in which said devices are located.

7. The combination with a transformer, an automatic circuit interrupter, a protective device, and an oil-containing casing therefor, of insulating bushings in one wall of the casing and interconnecting conductors for apparatus within the casing.

In testimony whereof, I have hereunto subscribed my name this 2nd day of April, 1907.

KARL C. RANDALL.

Witnesses:
FRANK CONRAD,
BIRNEY HINES.